United States Patent
Jeong et al.

(10) Patent No.: US 11,708,489 B2
(45) Date of Patent: Jul. 25, 2023

(54) THERMOPLASTIC POLYCARBONATE RESIN COMPOSITION AND MOLDED PRODUCT FORMED THEREFROM

(71) Applicant: LOTTE CHEMICAL CORPORATION, Seoul (KR)

(72) Inventors: Hyuk Jin Jeong, Uiwang-si (KR); Joon Hyung Yoo, Uiwang-si (KR); Woo Jin Lee, Uiwang-si (KR); Tae Gon Kang, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 170 days.

(21) Appl. No.: 17/281,004

(22) PCT Filed: Dec. 13, 2019

(86) PCT No.: PCT/KR2019/017675
§ 371 (c)(1),
(2) Date: Mar. 29, 2021

(87) PCT Pub. No.: WO2020/138785
PCT Pub. Date: Jul. 2, 2020

(65) Prior Publication Data
US 2021/0340373 A1    Nov. 4, 2021

(30) Foreign Application Priority Data
Dec. 27, 2018 (KR) .................. 10-2018-0171345

(51) Int. Cl.
| | |
|---|---|
| *C08L 69/00* | (2006.01) |
| *C08L 51/04* | (2006.01) |
| *C08K 3/22* | (2006.01) |
| *C08K 5/521* | (2006.01) |
| *C08K 5/524* | (2006.01) |

(52) U.S. Cl.
CPC .............. *C08L 69/00* (2013.01); *C08K 5/521* (2013.01); *C08K 5/524* (2013.01); *C08L 51/04* (2013.01); *C08K 2003/2296* (2013.01); *C08K 2201/005* (2013.01); *C08K 2201/006* (2013.01); *C08L 2205/03* (2013.01)

(58) Field of Classification Search
None
See application file for complete search history.

(56) References Cited

U.S. PATENT DOCUMENTS

| 9,340,671 B2 | 5/2016 | Ha et al. |
|---|---|---|
| 2007/0276081 A1 | 11/2007 | Yuan |
| 2015/0005422 A1 | 1/2015 | Ha et al. |
| 2018/0112056 A1 | 4/2018 | Yang et al. |
| 2020/0071519 A1 | 5/2020 | Hino |

FOREIGN PATENT DOCUMENTS

| JP | 2005-015658 A | 1/2005 |
|---|---|---|
| JP | 2009-538375 A | 11/2009 |
| KR | 10-2002-0053198 A | 7/2002 |
| KR | 10-0988999 B1 | 10/2010 |
| KR | 10-2015-0002355 A | 1/2015 |
| KR | 10-2018-0045777 A | 5/2018 |
| WO | 2018/116607 A1 | 6/2018 |
| WO | 2020/138785 A1 | 7/2020 |

OTHER PUBLICATIONS

Madhusha "Difference Between Plastic and Rubber" pediaa.com (2017) pp. 1-6. (Year: 2017).*
Search Report in counterpart European Application No. 19904704.4 dated Aug. 10, 2022, pp. 1-4.
International Search Report in counterpart International Application No. PCT/KR2019/017675 dated Mar. 24, 2020, pp. 1-4.

* cited by examiner

*Primary Examiner* — David J Buttner
(74) *Attorney, Agent, or Firm* — Additon, Pendleton & Witherspoon, P.A.

(57) ABSTRACT

A thermoplastic resin composition of the present invention comprises: approximately 100 parts by weight of a polycarbonate resin; approximately 0.1-5 parts by weight of a rubber-modified aromatic vinyl-based copolymer resin; approximately 0.1-7 parts by weight of zinc oxide; approximately 0.01-2 parts by weight of a C10-20 alkyl phosphate; approximately 0.01-2 parts by weight of a maleic anhydride-graft polymerized rubber polymer; and approximately 0.01-2 parts by weight of a phosphite-based antioxidant, wherein the zinc oxide has an average particle size of approximately 0.5-3 μm, a specific surface area BET of approximately 1-10 m²/g, a 2θ value as the peak position, of 35-37°, in X-ray diffraction analysis, and a crystallite size, represented by relation 1, of approximately 1,000-2,000 Å. The thermoplastic resin composition has excellent antibacterial properties, weather resistance, impact resistance, heat resistance and the like.

14 Claims, No Drawings

THERMOPLASTIC POLYCARBONATE RESIN COMPOSITION AND MOLDED PRODUCT FORMED THEREFROM

CROSS-REFERENCE TO RELATED APPLICATIONS

This application claims priority to and the benefit of International Application No. PCT/KR2019/017675, filed Dec. 13, 2019, which published as WO 2020/138785 on Jul. 2, 2020, and Korean Patent Application No. 10-2018-0171345, filed in the Korean Intellectual Property Office on Dec. 27, 2018, the entire disclosure of each of which is incorporated herein by reference.

TECHNICAL FIELD

The present invention relates to a thermoplastic resin composition and a molded article produced therefrom. More particularly, the present invention relates to a thermoplastic resin composition having good properties in terms of antibacterial properties, weather resistance, impact resistance, thermal resistance, and the like and a molded article formed of the same.

BACKGROUND ART

A thermoplastic resin composition including a polycarbonate resin, a rubber modified aromatic vinyl copolymer resin and a flame retardant has good impact resistance, flame retardancy and processability, and is advantageously used for interior/exterior materials for office machines and housings of electric/electronic devices that radiate heat.

However, articles formed of the thermoplastic resin composition including a polycarbonate resin and a rubber modified aromatic vinyl copolymer resin may become yellow over time and various bacteria may proliferate on the surface. In order to improve weather resistance and antibacterial properties of the thermoplastic resin composition, antibacterial agents and weathering stabilizers may be applied, but there is a problem that compatibility and impact resistance are deteriorated, and gas can be generated during injection molding due to resin decomposition.

Therefore, there is a need for a thermoplastic resin composition that is excellent in antibacterial properties, weather resistance, impact resistance, thermal resistance, and the like.

The background technique of the present invention is disclosed in Korean Patent No. 10-0988999.

DISCLOSURE

Technical Problem

It is one object of the present invention to provide a thermoplastic resin composition having good properties in terms of antibacterial properties, weather resistance, impact resistance, thermal resistance, and the like.

It is another object of the present invention to provide a molded article formed of the thermoplastic resin composition.

The above and other objects of the present invention can be achieved by the present invention described below.

Technical Solution

1. One aspect of the present invention relates to a thermoplastic resin composition. The thermoplastic resin composition comprises about 100 parts by weight of a polycarbonate resin; about 0.1 to about 5 parts by weight of a rubber modified aromatic vinyl copolymer resin; about 0.1 to about 7 parts by weight of a zinc oxide; about 0.01 to about 2 parts by weight of a $C_{10}$ to $C_{20}$ alkyl phosphate; about 0.01 to about 2 parts by weight of a maleic anhydride-grafted rubber polymer; and about 0.01 to about 2 parts by weight of a phosphite antioxidant, wherein the zinc oxide has an average particle size of about 0.5 μm to about 3 m and a BET specific surface area of about 1 $m^2/g$ to about 10 $m^2/g$, a peak position (2θ) in the range of 35° to 37° and a crystallite size of about 1,000 Å to about 2,000 Å, in X-ray diffraction (XRD) analysis, as calculated by Equation 1:

$$\text{Crystallite size } (D) = \frac{K\lambda}{\beta \cos \theta} \quad \text{[Equation 1]}$$

where K is a shape factor, X is an X-ray wavelength, R is an FWHM value (degree) of an X-ray diffraction peak, and 6 is a peak position degree.

2. In Embodiment 1, the rubber modified aromatic vinyl copolymer resin may comprise: a rubber modified vinyl graft copolymer, or a rubber modified vinyl graft copolymer and an aromatic vinyl copolymer resin.

3. In Embodiments 1 to 2, the rubber modified vinyl graft copolymer may be obtained by graft copolymerization of a monomer mixture comprising an aromatic vinyl monomer and a vinyl cyanide monomer to a rubber polymer.

4. In Embodiments 1 to 3, the zinc oxide may have a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement.

5. In Embodiments 1 to 4, the maleic anhydride-grafted rubber polymer may comprise at least one of maleic anhydride-grafted ethylene-octene rubber (MAH-g-EOR), maleic anhydride-grafted ethylene-butene rubber (MAH-g-EBR), maleic anhydride-grafted ethylene-propylene-diene monomer terpolymer (MAH-g-EPDM), maleic anhydride-grafted styrene-ethylene-butylene-styrene copolymer (MAH-g-SEBS), maleic anhydride-grafted polypropylene (MAH-g-PP), and maleic anhydride-grafted polyethylene (MAH-g-PE).

6. In Embodiments 1 to 5, the phosphite antioxidant may comprise at least one of bis(2,6-di-tert-butyl-4-methylphenyl)pentaerythritol diphosphite, bis(2,6-di-tert-butyl-4-ethylphenyl)pentaerythritol diphosphite, bis(2,4-dicumylphenyl) pentaerythritol diphosphite.

7. In Embodiments 1 to 6, a weight ratio of the zinc oxide to the alkyl phosphate may range from about 5:1 to about 35:1.

8. In Embodiments 1 to 7, a weight ratio of the zinc oxide to the phosphite antioxidant may range from about 5:1 to about 25:1.

9. In Embodiments 1 to 8, the thermoplastic resin composition may have an antibacterial activity of about 2.5 to about 7 against each of *Staphylococcus aureus* and *Escherichia coli*, as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

10. In Embodiments 1 to 9, the thermoplastic resin composition may have a color difference (ΔE) of about 1 or less, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after exposure to Xenon-Arc light for 300 hours in accordance with ASTM D4459:

$$\text{Color difference}(\Delta E) = \sqrt{(\Delta L^*)^2 + (\Delta a^*)^2 + (\Delta b^*)^2} \quad \text{[Equation 2]}$$

where $\Delta L^*$ is a difference ($L_1^* - L_0^*$) between $L^*$ values before/after exposure; $\Delta a^*$ is a difference ($a_1^* - a_0^*$) between $a^*$ values before/after exposure; and $\Delta b^*$ is a difference ($b_1^* - b_0^*$) between $b^*$ values before/after exposure.

11. In Embodiments 1 to 10, the thermoplastic resin composition may have a yellow index difference ($\Delta YI$) of about 2.2 or less, as calculated according to Equation 3:

$$\Delta YI = YI_1 - YI_0 \quad \text{[Equation 3]}$$

wherein $YI_0$ is an initial yellow index (YI) of a specimen, as measured in accordance with ASTM D1925, and $YI_1$ is a yellow index (YI) of the specimen, as measured in accordance with ASTM D1925 after the specimen is kept at 330° C. for 5 minutes.

12. In Embodiments 1 to 11, the thermoplastic resin composition may have a Notched Izod impact strength of about 50 kgf·cm/cm to about 100 kgf·cm/cm, as measured on a ⅛" thick specimen in accordance with ASTM D256.

13. In Embodiments 1 to 12, the thermoplastic resin composition may have a vicat softening temperature of about 135° C. to about 150° C., as measured at a heating rate of 120° C./hr under a load of 50 N in accordance with ISO 306/B50.

14. Another aspect of the present invention relates to a molded article. The molded article may be formed of the thermoplastic resin composition according to any one of Embodiments 1 to 13.

Advantageous Effects

The present invention provides a thermoplastic resin composition having good properties in terms of antibacterial properties, weather resistance, impact resistance, thermal resistance, and the like, and a molded article formed therefrom.

BEST MODE

Hereinafter, embodiments of the present invention will be described in detail.

A thermoplastic resin composition according to the present invention comprises (A) a polycarbonate resin; (B) a rubber modified aromatic vinyl copolymer resin; (C) a zinc oxide; (D) an alkyl phosphate; (E) a maleic anhydride-grafted rubber polymer; and (F) phosphite antioxidant.

As used herein to represent a specific numerical range, the expression "a to b" means "≥a and ≤b".

(A) Polycarbonate Resin

The polycarbonate resin may be a polycarbonate resin used in a typical thermoplastic resin composition. For example, the polycarbonate resin may be an aromatic polycarbonate resin prepared by reacting a diphenol(s) (aromatic diol compounds) with a precursor, such as phosgene, halogen formate, carbonate diester, and the like.

In some embodiments, the diphenols may include, for example, 4,4'-biphenol, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis-(3,5-dichloro-4-hydroxyphenyl) propane, without being limited thereto. For example, the diphenols may be 2,2-bis(4-hydroxyphenyl)propane, 2,2-bis(3,5-dichloro-4-hydroxyphenyl)propane or 1,1-bis(4-hydroxyphenyl)cyclohexane, specifically 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition may have good mechanical properties, flowability (processability), and the like. In addition, the polycarbonate resin may be a mixture of two or more polycarbonate resins having different weight average molecular weights.

(B) Rubber-Modified Aromatic Vinyl Copolymer Resin

According to one embodiment of the invention, the rubber modified aromatic vinyl copolymer resin may include (B1) a rubber modified vinyl graft copolymer and (B2) an aromatic vinyl copolymer resin.

(B1) Rubber Modified Vinyl Graft Copolymer

According to one embodiment of the invention, the rubber modified vinyl graft copolymer may be obtained by graft polymerization of a monomer mixture comprising an aromatic vinyl monomer and a vinyl cyanide monomer to a rubber polymer. For example, the rubber modified vinyl graft copolymer may be obtained by graft polymerization of the monomer mixture comprising the aromatic vinyl monomer and the vinyl cyanide monomer to the rubber polymer, in which the monomer mixture may further include a monomer for imparting processability and thermal resistance, as needed. Here, polymerization may be performed by any typical polymerization method, such as emulsion polymerization, suspension polymerization, and the like. In addition, the rubber modified vinyl graft copolymer may form a core (rubber polymer)-shell (copolymer of the monomer mixture) structure, without being limited thereto.

In some embodiments, the rubber polymer may include diene rubbers, such as polybutadiene, poly(styrene-butadiene), and poly(acrylonitrile-butadiene); saturated rubbers obtained by adding hydrogen to the diene rubbers; isoprene rubbers; $C_2$ to $C_{10}$ alkyl (meth)acrylate rubbers; a copolymer of a $C_2$ to $C_{10}$ alkyl (meth)acrylate and styrene; and ethylene-propylene-diene monomer terpolymer (EPDM), and the like. These may be used alone or as a mixture thereof. For example, the rubber polymer may include diene rubbers and C2 to C10 alkyl (meth)acrylate rubbers. Specifically, the rubber polymer may include butadiene rubber, butyl acrylate rubber and the like.

The rubber polymer (rubber particle) may have an average particle diameter (Z-average) of about 0.05 μm to about 6 m, for example, about 0.15 μm to about 4 m, specifically about 0.25 μm to about 3.5 m. Within this range, the thermoplastic resin composition can have good properties in terms of impact resistance, external appearance, and the like. Here, the average particle diameter (Z-average) of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is poured in a 1,000 ml flask, and filled with distilled water to prepare a specimen. Then, 10 ml of the specimen is transferred to a quartz cell, followed by measurement of the average particle diameter of the rubber polymer using a light scattering particle analyzer (Malvern Co. Ltd., nano-zs).

In some embodiments, based on 100 wt % of the rubber modified vinyl graft copolymer, the rubber polymer may be present in an amount of about 20 wt % to about 70 wt %, for example, about 25 wt % to about 60 wt %, and the monomer mixture (including the aromatic vinyl monomer and the vinyl cyanide monomer) may be present in an amount of about 30 wt % to about 80 wt %, for example, about 40 wt % to about 75 wt %. Within this range, the thermoplastic resin composition can have good properties in terms of impact resistance, external appearance, and the like.

In some embodiments, the aromatic vinyl monomer may be graft copolymerizable with the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good properties in terms of processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile or methacrylonitrile. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good properties in terms of chemical resistance, mechanical properties, and the like.

Examples of the monomer for imparting processability and thermal resistance may include (meth)acrylic acid, maleic anhydride, and N-substituted maleimide, without being limited thereto. The monomer for imparting processability and thermal resistance may be present in an amount of about 15 wt % or less, for example, about 0.1 wt % to about 10 wt %, based on 100 wt % of the monomer mixture. Within this range, the monomer for imparting processability and thermal resistance can impart processability and thermal resistance to the thermoplastic resin composition without deterioration in other properties.

Examples of the rubber modified vinyl graft copolymer may include a g-ABS copolymer obtained by grafting a styrene monomer (as the aromatic vinyl monomer) and an acrylonitrile monomer (as the vinyl cyanide monomer) to a butadiene-based rubber polymer, a g-MBS copolymer obtained by grafting a styrene monomer (as the aromatic vinyl monomer) and methyl methacrylate (as the monomer copolymerizable therewith) to a butadiene-based rubber polymer, an acrylate-styrene-acrylate (g-ASA) copolymer obtained by grafting a styrene monomer (as the aromatic vinyl monomer) and an acrylonitrile monomer (as the vinyl cyanide monomer) to a butyl acrylate-based rubber polymer, and the like. For example, g-MBS, and the like can be used.

(B2) Aromatic Vinyl Copolymer Resin

According to the embodiment of the invention, the aromatic vinyl copolymer resin may be an aromatic vinyl copolymer resin used for a typical rubber modified aromatic vinyl graft copolymer resin. For example, the aromatic vinyl copolymer resin may be a polymer of a monomer mixture comprising an aromatic vinyl monomer and a monomer copolymerizable with the aromatic vinyl monomer.

In some embodiments, the aromatic vinyl copolymer resin may be obtained by mixing the aromatic vinyl monomer and the monomer copolymerizable with the aromatic vinyl monomer, followed by polymerization. Here, polymerization may be carried out by any well-known polymerization method, such as emulsion polymerization, suspension polymerization, bulk polymerization, and the like.

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good properties in terms of impact resistance, fluidity, and the like.

In some embodiments, the monomer copolymerizable with the aromatic vinyl monomer may include at least one of a vinyl cyanide monomer and an alkyl (meth)acrylic monomer. For example, the monomer copolymerizable with the aromatic vinyl monomer may include a vinyl cyanide monomer, or a combination of a vinyl cyanide monomer and an alkyl (meth)acrylic monomer, specifically a vinyl cyanide monomer and an alkyl (meth)acrylic monomer.

Examples of the vinyl cyanide monomer may include acrylonitrile, methacrylonitrile, ethacrylonitrile, phenylacrylonitrile, α-chloroacrylonitrile, and fumaronitrile, without being limited thereto. These may be used alone or as a mixture thereof. For example, acrylonitrile, methacrylonitrile, and the like may be used.

In some embodiments, the alkyl (meth)acrylic monomer may include (meth)acrylic acid and/or $C_1$ to $C_{10}$ alkyl (meth)acrylates. These may be used alone or as a mixture thereof. For example, methyl methacrylate, methyl acrylate, and the like may be used.

In some embodiments, when the monomer copolymerizable with the aromatic vinyl monomer is a mixture of the vinyl cyanide monomer and the alkyl (meth)acrylic monomer, the vinyl cyanide monomer may be present in an amount of about 1 wt % to about 40 wt %, for example, about 2 wt % to about 35 wt %, and the alkyl (meth)acrylic monomer may be present in an amount of about 60 wt % to about 99 wt %, for example, about 65 wt % to about 98 wt %, based on 100 wt % of the monomer copolymerizable with the aromatic vinyl monomer. Within this range, the thermoplastic resin composition can exhibit good properties in terms of transparency, thermal resistance, processability, and the like.

In some embodiments, the monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good properties in terms of impact resistance, fluidity, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of mechanical strength, processability, and the like.

In some embodiments, when the rubber modified aromatic vinyl copolymer resin (B) includes (B1) a rubber modified vinyl graft copolymer and (B2) an aromatic vinyl copolymer resin, the rubber modified vinyl graft copolymer may be present in an amount of about 20 wt % to about 50 wt %, for example, about 25 wt % to about 45 wt %, based on 100 wt % of the rubber modified aromatic vinyl copolymer resin, and the aromatic vinyl copolymer resin may be present in an amount of about 50 wt % to about 80 wt %, for example, about 55 wt % to about 75 wt %, based on 100 wt % of the rubber modified aromatic vinyl copolymer resin. Within this range, the thermoplastic resin composition can exhibit good properties in terms of impact resistance, fluidity (molding processability), and the like.

In some embodiments, the rubber modified aromatic vinyl copolymer resin may be present in an amount of about 0.1 parts by weight to about 5 parts by weight, for example, about 0.5 parts by weight to about 3 parts by weight, relative to 100 parts by weight of the polycarbonate resin. If the amount of the rubber modified aromatic vinyl copolymer resin is less than 0.1 part by weight, the thermoplastic resin composition can suffer from deterioration in impact resistance, and the like, and if the amount of the rubber modified aromatic vinyl copolymer resin exceeds 5 parts by weight, the thermoplastic resin composition can suffer from deterioration in stiffness (flexural modulus, etc.), thermal resistance (retention heat stability during injection).

(C) Zinc Oxide

According to the present invention, the zinc oxide serves to improve antibacterial properties, weather resistance, impact resistance, thermal resistance and balance therebetween of the thermoplastic resin composition together with the alkyl phosphate and the phosphite antioxidant. The zinc oxide may have an average particle diameter (D50) of primary particles (not forming a secondary particle through agglomeration of particles) of about 0.5 μm to about 3 μm, for example, about 0.8 μm to about 3 μm, as measured using a particle size analyzer (Laser Diffraction Particle Size Analyzer LS 13320, Beckman Coulter Co., Ltd.). Further, the zinc oxide may have a BET specific surface area of about 1 m²/g to about 10 m²/g, for example, about 1 m²/g to about 7 m²/g, as measured by a nitrogen gas adsorption method using a BET analyzer (Surface Area and Porosity Analyzer ASAP 2020, Micromeritics Co., Ltd.) and may have a purity of about 99% or higher. If these parameters of the zinc oxide are outside these ranges, the thermoplastic resin composition may have poor properties in terms of weather resistance (light resistance, discoloration resistance) and antibacterial properties.

In one embodiment, the zinc oxide may have a peak position degree (2θ) in the range of 35° to 37° and a crystallite size of about 1,000 Å to about 2,000 Å, for example, about 1,200 Å to about 1,800 Å in analysis of X-ray diffraction (XRD), as calculated by Scherrer's Equation (Equation 1) with reference to a measured FWHM value (full width at half maximum of a diffraction peak). If these parameters of the zinc oxide are outside these ranges, the thermoplastic resin composition may have poor properties in terms of weather resistance (light resistance, discoloration resistance), antibacterial properties, and the like.

$$\text{Crystallite size } (D) = \frac{K\lambda}{\beta \cos \theta} \quad \text{[Equation 1]}$$

where K is a shape factor, λ is an X-ray wavelength, β is an FWHM value (degree), and θ is a peak position degree.

In some embodiments, the zinc oxide may have various shape, for example, a spherical shape, a plate shape, a rod shape, a combination thereof, and the like.

In some embodiments, the zinc oxide may have a peak intensity ratio (B/A) of about 0.01 to about 1.0, for example, about 0.1 to about 1.0, specifically about 0.1 to about 0.5, where A indicates a peak in the wavelength range of 370 nm to 390 nm and B indicates a peak in the wavelength range of 450 nm to 600 nm in photoluminescence measurement. Within this range, the thermoplastic resin composition may have good properties in terms of weather resistance, antibacterial properties, impact resistance and the like.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., followed by heating the reactor to about 400° C. to about 900° C., for example about 500° C. to about 800° C. for about 30 minutes to about 150 minutes, for example, about 60 minutes to about 120 minutes.

In some embodiments, the zinc oxide may be present in an amount of about 0.1 part by weight to about 7 parts by weight, for example, about 1 part by weight to about 5 parts by weight, specifically, about 2 parts by weight to about 4 parts by weight, relative to about 100 parts by weight of the polycarbonate resin. If the amount of the zinc oxide is less than 0.1 part by weight, the thermoplastic resin composition can suffer from deterioration in weather resistance (light resistance, discoloration resistance), antibacterial properties. If the amount of the zinc oxide is more than 10 parts by weight, impact resistance and thermal resistance (retention heat stability during injection) of the thermoplastic resin composition could be deteriorated.

(D) Alkyl Phosphate

The alkyl phosphate may serve to improve impact resistance, weather resistance, antibacterial properties, thermal resistance, and the like of the thermoplastic resin composition together with the zinc oxide and the phosphite antioxidant, and $C_{10}$ to $C_{20}$ alkyl phosphate can be used.

In some embodiments, examples of the alkyl phosphate may include dodecyl phosphate, tetradecyl phosphate, hexadecyl phosphate, octadecyl phosphate, and the like. These can be used alone or in combination of two or more. For example, the alkyl phosphate may be octadecyl phosphate.

In some embodiments, the alkyl phosphate may be present in an amount of about 0.01 parts by weight to about 2 parts by weight, for example about 0.05 parts by weight to about 1 part by weight, specifically, about 0.1 parts by weight to about 0.5 parts by weight, relative to about 100 parts by weight of the polycarbonate resin. If the amount of the alkyl phosphate is less than 0.01 part by weight, the thermoplastic resin composition can suffer from deterioration in thermal resistance (retention heat stability during injection). If the amount of the alkyl phosphate is more than 2 parts by weight, impact resistance and thermal resistance of the thermoplastic resin composition could be deteriorated.

In some embodiments, the zinc oxide and the alkyl phosphate may be present in a weight ratio (zinc oxide:alkyl phosphate) of about about 5:1 to about 35:1, for example about 10:1 to about 30:1. Within this range, the thermoplastic resin composition may have further improved properties in terms of antibacterial properties, weather resistance, impact resistance and balance therebetween.

(E) Maleic Anhydride-Grafted Rubber Polymer

The maleic anhydride-grafted rubber polymer according to one embodiment of the invention serves to improve flowability, impact resistance, thermal stability of the thermoplastic resin composition, and may be prepared by graft polymerization of maleic anhydride (MAH) to a rubber polymer (a copolymer of olefin and/or an aromatic vinyl monomer).

In some embodiments, the maleic anhydride-grafted rubber polymer may include at least one of maleic anhydride-grafted ethylene-octene rubber (MAH-g-EOR), maleic anhydride-grafted ethylene-butene rubber (MAH-g-EBR), maleic anhydride-grafted ethylene-propylene-diene monomer terpolymer (MAH-g-EPDM), maleic anhydride-grafted styrene-ethylene-butadiene-styrene copolymer (MAH-g-SEBS), maleic anhydride-grafted polypropylene (MAH-g-PP), and maleic anhydride-grafted polyethylene (MAH-g-PE).

In some embodiments, the maleic anhydride may be present in an amount of about 0.1 wt % to about 5 wt % and the rubber polymer may be present in an amount of about 95 wt % to about 99.9 wt % based on 100 wt % of the maleic anhydride-grafted rubber polymer, without being limited thereto.

In some embodiments, the maleic anhydride-grafted rubber polymer may be present in an amount of about 0.01 parts by weight to about 2 parts by weight, for example, about 0.1 parts by weight to about 1 part by weight, relative to about 100 parts by weight of the polycarbonate resin. If the amount of the maleic anhydride-grafted rubber polymer is less than 0.01 part by weight, the thermoplastic resin composition can suffer from deterioration in impact resistance, thermal resistance (retention heat stability during injection). If the amount of the maleic anhydride-grafted rubber polymer is more than 2 parts by weight, stiffness (flexural modulus, tensile strength, etc.) of the thermoplastic resin composition could be deteriorated.

(F) Phosphite Antioxidant

According to the present invention, the phosphite antioxidant is applied together with the zinc oxide and the alkyl phosphate in preparation of the thermoplastic resin composition to improve impact resistance, weather resistance, antibacterial properties, thermal resistance, and the like of the thermoplastic resin composition, and the phosphite antioxidant may be a phosphite antioxidant used in a typical thermoplastic resin composition.

In one embodiment, the phosphite antioxidant may include at least one of bis(2,6-di-tert-butyl-4-methylphenyl) pentaerythritol diphosphite, bis(2,6-di-tert-butyl-4-ethylphenyl)pentaerythritol diphosphite, bis(2,4-dicumylphenyl) pentaerythritol diphosphate. For example, bis(2,6-di-tert-butyl-4-methylphenyl)pentaerythritol diphosphate can be used.

In some embodiments, the phosphite antioxidant may be present in an amount of about 0.01 part by weight to about 2 parts by weight, for example, about 0.1 parts by weight to about 1 part by weight, specifically, about 0.1 part by weight to about 0.5 parts by weight, relative to about 100 parts by weight of the polycarbonate resin. If the amount of the phosphite antioxidant is less than 0.01 part by weight, the thermoplastic resin composition can suffer from deterioration in weather resistance (discoloration resistance). If the amount of the phosphite antioxidant is more than 2 parts by weight, impact resistance and thermal resistance (retention heat stability during injection) of the thermoplastic resin composition could be deteriorated.

In some embodiments, the zinc oxide and the phosphite antioxidant may be present in a weight ratio (zinc oxide: phosphite antioxidant) of about 5:1 to about 25:1, for example about 10:1 to about 20:1. Within this range, the thermoplastic resin composition may have further improved properties in terms of antibacterial properties, weather resistance, impact resistance, thermal resistance and balance therebetween.

In one embodiment, the thermoplastic resin composition may further include any typical additive included in thermoplastic resin compositions. Examples of the additive may include a flame retardant, an anti-dripping agent, a lubricant, a nucleating agent, a stabilizer, a release agent, pigments, dyes, and the like, and mixtures thereof, without being limited thereto. The additives may be present in an amount of about 0.001 parts by weight to about 40 parts by weight, for example, about 0.01 parts by weight to about 10 parts by weight, relative to about 100 parts by weight of the thermoplastic resin.

The thermoplastic resin composition may be prepared in pellet form by mixing the aforementioned components, followed by melt extrusion using a typical twin-screw extruder at about 240 to about 300° C., for example about 260 to about 280° C.

In some embodiments, the thermoplastic resin composition may have an antibacterial activity of about 2.5 to about 7, for example about 2.6 to about 6 against each of *Staphylococcus aureus* and *Escherichia coli*, as measured on 5 cm×5 cm specimens in accordance with JIS Z 2801 after inoculation with *Staphylococcus aureus* and *Escherichia coli*, respectively, followed by culturing under conditions of 35° C. and 90% RH for 24 hours.

In some embodiments, the thermoplastic resin composition may have a color difference (ΔE) of about 1 or less, for example, about 0.1 to about 0.4, as calculated according to Equation 2 based on initial color values ($L_0^*$, $a_0^*$, $b_0^*$) measured on an injection-molded specimen having a size of 50 mm× 90 mm× 3 mm using a colorimeter and color values ($L_1^*$, $a_1^*$, $b_1^*$) of the specimen measured using the colorimeter after exposure to Xenon-Arc light for 300 hours in accordance with ASTM D4459.

$$\text{Color difference}(\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before/after exposure; Δa* is a difference ($a_1^* - a_0^*$) between a* values before/after exposure; and Δb* is a difference ($b_1^* - b_0^*$) between b* values before/after exposure.

In some embodiments, the thermoplastic resin composition may have a yellow index difference (ΔYI) of about 2.2 or less, for example about 1.2 to about 2.2, as calculated according to Equation 3:

$$\Delta YI = YI_1 - YI_0 \quad \text{[Equation 3]}$$

wherein $YI_0$ is an initial yellow index (YI) of a specimen, as measured in accordance with ASTM D1925, and $YI_1$ is a yellow index (YI) of the specimen, as measured in accordance with ASTM D1925 after the specimen is kept at 330° C. for 5 minutes.

In some embodiments, the thermoplastic resin composition may have a Notched Izod impact strength of about 50 kgf·cm/cm to about 100 kgf·cm/cm, for example about 60 kgf·cm/cm to about 90 kgf·cm/cm, as measured on a ⅛" thick specimen in accordance with ASTM D256

In some embodiments, the thermoplastic resin composition may have a vicat softening temperature of about 135° C. to about 150° C., for example about 137° C. to about 147° C., as measured at a heating rate of 120° C./hr under a load of 50 N in accordance with ISO 306/B50.

A molded article according to the present invention is formed of the thermoplastic resin composition set forth above. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles may exhibit good properties in terms of antibacterial properties, weather resistance, impact resistance, thermal resistance, and balance therebetween, and thus may be used in various fields, such as interior/exterior materials for electric/electronic products, such as electrical switch parts and the like.

MODE FOR INVENTION

Next, the present invention will be described in more detail with reference to some examples. It should be understood that these examples are provided for illustration only and are not to be in any way construed as limiting the present invention.

Example

Details of components used in Examples and Comparative Examples are as follows:

(A) Polycarbonate Resin

A bisphenol-A polycarbonate resin (weight average molecular weight: 25,000 g/mol) was used.

(B) Rubber-Modified Aromatic Vinyl Copolymer Resin

MBS (Manufacturer: LG Chem. Ltd, product name: EM520) was used.

(C) Zinc Oxide (C1) Metallic zinc was melted in a reactor, followed by heating to 900° C. to vaporize the molten zinc, and then oxygen gas was injected into the reactor, followed by cooling to room temperature (25° C.) to obtain an intermediate. Then, the intermediate was subjected to heat treatment at 700° C. for 90 minutes, followed by cooling to room temperature (25° C.), thereby preparing zinc oxide (C1).

(C2) Zinc oxide (Manufacturer: Ristecbiz Co., Ltd., product name: RZ-950) was used.

(C3) Zinc oxide (Manufacturer: Hanil Chemical Co., Ltd., product name: TE30) was used.

Average particle diameter, BET surface area, purity, peak intensity ratio (B/A) of peak B in the wavelength range of 450 nm to 600 nm to peak A in the wavelength range of 370 nm to 390 nm in photoluminescence measurement, and crystallite size of the zinc oxides (C1), (C2) and (C3) are shown in Table 1.

(D) Phosphate (D1) Octadecyl phosphate (Manufacturer: ADEKA, product name: ADK STAB AX-71) was used as an alkyl phosphate.

(D2) Triphenyl phosphate (Manufacturer: DAIHACHI, product name: PHOSFLEX TPP) was used.

(E) Maleic anhydride-grafted rubber polymer

Maleic anhydride-grafted ethylene-butene rubber (MAH-g-EBR, Manufacturer: Mitsui chemical, product name: TAFMER M) was used.

(F) Antioxidant (F1) Bis(2,6-di-tert-butyl-4-methylphenyl)pentaerythritol-di-phosphite was used as a phosphite antioxidant.

(F2) Octadecyl-3 (3,5-di-tertbutyl-4-hydroxyphenyl) propionate (Manufacturer: BASF, product name: Irganox 1076) was used as a hindered phenolic antioxidant.

TABLE 1

|  | (C1) | (C2) | (C3) |
| --- | --- | --- | --- |
| Average particle diameter (μm) | 1.2 | 0.890 | 3.7 |
| BET surface area (m²/g) | 4 | 15 | 14 |
| Purity (%) | 99 | 97 | 97 |
| PL peak intensity ratio (B/A) | 0.28 | 9.8 | 9.5 |
| Crystallite size (Å) | 1,417 | 503 | 489 |

Property Evaluation (1) Average particle size (unit: m): Average particle size (volume average) was measured using a particle size analyzer (Laser Diffraction Particle size analyzer LS 13320, Beckman Coulter Co., Ltd.).

(2) BET surface area (unit: m²/g): BET surface area was measured by a nitrogen gas adsorption method.

(3) Purity (unit: %): Purity was measured by thermogravimetric analysis (TGA) based on the weight of the remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Co., Ltd.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used, and for more accurate analysis, the injection molded specimen was subjected to heat treatment at 600° C. in air for 2 hours to remove a polymer resin before XRD analysis.

$$\text{Crystallite size } (D) = \frac{K\lambda}{\beta \cos \theta} \qquad \text{[Equation 1]}$$

where K is a shape factor, λ is an X-ray wavelength, β is an FWHM value (degree), and θ is a peak position degree.

Examples 1 to 5 and Comparative Examples 1 to 12

The aforementioned components were mixed in amounts as listed in Tables 2 and 3, followed by extrusion at 260° C., thereby preparing a thermoplastic resin composition in pellet form. Here, extrusion was performed using a twin-screw extruder (L/D: 36, Φ: 45 mm). The prepared pellets were dried at 100° C. for 2 hours or more and then subjected to injection molding using a 140 ton injection machine (molding temperature: 280° C., mold temperature: 80° C.), thereby preparing a specimen. The prepared specimen was evaluated as to the following properties. Results are shown in Tables 2 and 3.

Property Evaluation (1) Antibacterial activity: In accordance with JIS Z 2801, 5 cm×5 cm injected specimens were inoculated with *Staphylococcus aureus* and *Escherichia coli*, respectively, and then subjected to culturing under conditions of 35° C. and 90% RH for 24 hours, followed by measuring antibacterial activity.

(2) Weather resistance (Color difference (ΔE)): Initial color values ($L_0^*$, $a_0^*$, $b_0^*$) were measured on an injection molded specimen having a size of 50 mm×90 mm×3 mm using a colorimeter (KONICA MINOLTA CM-3700A). Then the injection molded specimen was exposed to Xenon-Arc light for 300 hours in accordance with ASTM D4459, followed by measuring color values ($L_1^*$, $a_1^*$, $b_1^*$) of the specimen using the colorimeter. Thereafter, color difference (ΔE) was calculated according to Equation 2.

$$\text{Color difference}(\Delta E) = \sqrt{(\Delta L^*)^2 + (\Delta a^*)^2 + (\Delta b^*)^2} \quad \text{[Equation 2]}$$

where $\Delta L^*$ is a difference ($L_1^* - L_0^*$) between L* values before/after exposure; $\Delta a^*$ is a difference ($a_1^* - a_0^*$) between a* values before/after exposure; and $\Delta b^*$ is a difference ($b_1^* - b_0^*$) between b* values before/after exposure.

(3) Weather resistance (discoloration resistance, yellow index difference (ΔYI)): Yellow index difference (ΔYI) was calculated according to Equation 3:

$$\Delta YI = YI_1 - YI_0 \quad \text{[Equation 3]}$$

wherein $YI_0$ is an initial yellow index (YI) of a specimen, as measured in accordance with ASTM D1925, and $YI_1$ is a yellow index (YI) of the specimen, as measured in accordance with ASTM D1925 after the specimen is kept at 330° C. for 5 minutes.

(4) Notched Izod impact strength (unit: kgf cm/cm): Izod impact strength was measured on a ⅛" thick notched Izod specimen in accordance with ASTM D256.

(5) VST (unit: ° C.): Vicat softening temperature was measured at a heating rate of 120° C./hr under a load of 50 N in accordance with ISO 306/B50.

TABLE 2

| | Example | | | | | Comparative Example | | | |
|---|---|---|---|---|---|---|---|---|---|
| | 1 | 2 | 3 | 4 | 5 | 1 | 2 | 3 | 4 |
| (A) (parts by weight) | 100 | 100 | 100 | 100 | 100 | 100 | 100 | 100 | 100 |
| (B) (parts by weight) | 1 | 1 | 1 | 1 | 1 | 1 | 1 | 1 | 1 |
| (C1) (parts by weight) | 2 | 3 | 4 | 3 | 3 | 0.05 | 8 | — | — |
| (C2) (parts by weight) | — | — | — | — | — | — | — | 3 | — |
| (C3) (parts by weight) | — | — | — | — | — | — | — | — | 3 |
| (D1) (parts by weight) | 0.2 | 0.2 | 0.2 | 0.1 | 0.3 | 0.2 | 0.2 | 0.2 | 0.2 |
| (D2) (parts by weight) | — | — | — | — | — | — | — | — | — |
| (E) (parts by weight) | 0.2 | 0.2 | 0.2 | 0.2 | 0.2 | 0.2 | 0.2 | 0.2 | 0.2 |
| (F1) (parts by weight) | 0.2 | 0.2 | 0.2 | 0.2 | 0.2 | 0.2 | 0.2 | 0.2 | 0.2 |
| (F2) (parts by weight) | — | — | — | — | — | — | — | — | — |
| Antibacterial activity (*Staphylococcus aureus*) | 3.4 | 4.0 | 4.5 | 4.0 | 4.1 | 0.3 | 6.2 | 1.7 | 2.1 |
| Antibacterial activity (*Escherichia coli*) | 4.0 | 4.2 | 4.6 | 4.1 | 4.1 | 0.1 | 5.8 | 1.8 | 1.6 |
| Color difference(ΔF) | 0.32 | 0.25 | 0.15 | 0.26 | 0.24 | 2.1 | 0.12 | 2.3 | 1.9 |
| Yellow index difference (ΔYI) | 1.7 | 1.9 | 2.1 | 2.0 | 1.9 | 1.8 | 4.2 | 3.4 | 3.1 |
| Notched Izod impact strength | 71 | 68 | 65 | 69 | 70 | 71 | 12 | 8 | 9 |
| VST | 142 | 142 | 141 | 142 | 141 | 142 | 138 | 141 | 141 |

TABLE 3

| | Comparative Example | | | | | | | |
|---|---|---|---|---|---|---|---|---|
| | 5 | 6 | 7 | 8 | 9 | 10 | 11 | 12 |
| (A) (parts by weight) | 100 | 100 | 100 | 100 | 100 | 100 | 100 | 100 |
| (B) (parts by weight) | 1 | 1 | 1 | 1 | 1 | 1 | 1 | 1 |
| (C1) (parts by weight) | 3 | 3 | 3 | 3 | 3 | 3 | 3 | 3 |
| (C2) (parts by weight) | — | — | — | — | — | — | — | — |
| (C3) (parts by weight) | — | — | — | — | — | — | — | — |
| (D1) (parts by weight) | — | 3 | — | 0.2 | 0.2 | 0.2 | 0.2 | 0.2 |
| (D2) (parts by weight) | — | — | 0.2 | — | — | — | — | — |
| (E) (parts by weight) | 0.2 | 0.2 | 0.2 | — | 3 | 0.2 | 0.2 | 0.2 |
| (F1) (parts by weight) | 0.2 | 0.2 | 0.2 | 0.2 | 0.2 | — | 3 | — |
| (F2) (parts by weight) | — | — | — | — | — | — | — | 0.2 |

TABLE 3-continued

|  | Comparative Example | | | | | | | |
|---|---|---|---|---|---|---|---|---|
|  | 5 | 6 | 7 | 8 | 9 | 10 | 11 | 12 |
| Antibacterial activity (*Staphylococcus aureus*) | 3.9 | 3.8 | 4.1 | 3.7 | 3.8 | 4.0 | 3.5 | 3.7 |
| Antibacterial activity (*Escherichia coli*) | 3.8 | 4.0 | 3.4 | 4.0 | 3.5 | 4.1 | 4.0 | 3.9 |
| Color difference(ΔF) | 0.32 | 1.4 | 0.35 | 0.34 | 4.5 | 0.25 | 2.1 | 0.24 |
| Yellow index difference (ΔYI) | 4.2 | 10.2 | 1.6 | 3.8 | 14.7 | 4.1 | 7.8 | 3.5 |
| Notched Izod impac strength | 42 | 7 | 11 | 38 | 15 | 47 | 3 | 55 |
| VST | 142 | 124 | 141 | 142 | 129 | 142 | 123 | 142 |

From the above results, it can be seen that the thermoplastic resin composition according to the present invention had good properties in terms of antibacterial property (antibacterial activity), weather resistance (Color difference (ΔE), yellow index difference (ΔYI)), impact resistance (Notched Izod impact strength), thermal resistance (VST) and balance therebetween.

In contrast, it could be seen that the composition of Comparative Example 1 prepared using a small amount of the zinc oxide suffered from deterioration in antibacterial properties, weather resistance; the composition of Comparative Example 2 prepared using an excess of the zinc oxide suffered from deterioration in weather resistance, impact resistance and thermal resistance of the composition was relatively deteriorated; the composition of Comparative Example 3 prepared using zinc oxide (C2) instead of zinc oxide (C1) of the present invention suffered from deterioration in antibacterial properties, weather resistance, impact resistance and the like; the composition of Comparative Example 4 prepared using zinc oxide (C3) instead of zinc oxide (C1) of the present invention suffered from deterioration in antibacterial properties, weather resistance, impact resistance and the like; the composition of Comparative Example 5 not containing alkyl phosphate suffered from deterioration in weather resistance, impact resistance, and the like; the composition of Comparative Example 6 prepared using an excess of alkyl phosphate suffered from deterioration in weather resistance, impact resistance, and the like; the composition of Comparative Example 7 prepared using triphenyl phosphate (D2) instead of alkyl phosphate (D1) of the present invention suffered from deterioration in impact resistance and the like; the composition of Comparative Example 8 not containing maleic anhydride-grafted rubber polymer suffered from deterioration in weather resistance, impact resistance, and the like; the composition of Comparative Example 9 prepared using an excess of maleic anhydride-grafted rubber polymer suffered from deterioration in weather resistance, impact resistance, thermal resistance, and the like; the composition of Comparative Example 10 not containing phosphite antioxidant suffered from deterioration in weather resistance, impact resistance, and the like; the composition of Comparative Example 11 prepared using an excess of phosphite antioxidant suffered from deterioration in weather resistance, impact resistance, thermal resistance, and the like; the composition of Comparative Example 12 prepared using hindered phenolic antioxidant (F2) instead of phosphite antioxidant (F1) of the present invention suffered from deterioration in weather resistance and the like, and the impact resistance of the composition was relatively deteriorated.

While certain exemplary embodiments of the present invention have been illustrated and described, those of ordinary skill in the art will understand that various modifications, changes, alterations, and equivalent embodiments can be made without departing from the spirit and scope of the invention, as described in the following claims, and equivalents thereof. Also, it should be understood that these embodiments are provided for illustration only and are not to be construed in any way as limiting the present invention. The scope of the present invention should be defined by the appended claims and equivalents thereof.

The invention claimed is:

1. A thermoplastic resin composition comprising:
   about 100 parts by weight of a polycarbonate resin;
   about 0.1 to about 5 parts by weight of a rubber modified aromatic vinyl copolymer resin;
   about 0.1 to about 7 parts by weight of a zinc oxide;
   about 0.01 to about 2 parts by weight of a $C_{10}$ to $C_{20}$ alkyl phosphate;
   about 0.01 to about 2 parts by weight of a maleic anhydride-grafted rubber polymer; and
   about 0.01 to about 2 parts by weight of a phosphite antioxidant,
   wherein the zinc oxide has an average particle size of about 0.5 μm to about 3 μm and a BET specific surface area of about 1 $m^2/g$ to about 10 $m^2/g$, a peak position (2θ) in the range of 35° to 37° and a crystallite size of about 1,000 Å to about 2,000 Å, in X-ray diffraction (XRD) analysis, as calculated by Equation 1:

$$\text{Crystallite size } (D) = \frac{K\lambda}{\beta \cos \theta} \quad \text{[Equation 1]}$$

where K is a shape factor, λ is an X-ray wavelength, β is an FWHM value (degree) of an X-ray diffraction peak, and θ is a peak position degree.

2. The thermoplastic resin composition according to claim 1, wherein the rubber modified aromatic vinyl copolymer resin comprises: a rubber modified vinyl graft copolymer, or a rubber modified vinyl graft copolymer and an aromatic vinyl copolymer resin.

3. The thermoplastic resin composition according to claim 2, wherein the rubber modified vinyl graft copolymer is obtained by graft copolymerization of a monomer mixture comprising an aromatic vinyl monomer and a vinyl cyanide monomer to a rubber polymer.

4. The thermoplastic resin composition according to claim 1, wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement.

5. The thermoplastic resin composition according to claim 1, wherein the maleic anhydride-grafted rubber polymer comprises maleic anhydride-grafted ethylene-octene rubber (MAH-g-EOR), maleic anhydride-grafted ethylene-butene rubber (MAH-g-EBR), maleic anhydride-grafted ethylene-propylene-diene monomer terpolymer (MAH-g-EPDM), and/or maleic anhydride-grafted styrene-ethylene-butylene-styrene copolymer (MAH-g-SEBS).

6. The thermoplastic resin composition according to claim 1, wherein the phosphite antioxidant comprises bis(2,6-di-tert-butyl-4-methylphenyl)pentaerythritol diphosphite, bis(2,6-di-tert-butyl-4-ethylphenyl)pentaerythritol diphosphite, and/or bis(2,4-dicumylphenyl) pentaerythritol diphosphate.

7. The thermoplastic resin composition according to claim 1, wherein a weight ratio of the zinc oxide to the alkyl phosphate ranges from about 5:1 to about 35:1.

8. The thermoplastic resin composition according to claim 1, wherein a weight ratio of the zinc oxide to the phosphite antioxidant ranges from about 5:1 to about 25:1.

9. The thermoplastic resin composition according to claim 1, wherein the thermoplastic resin composition has an antibacterial activity of about 2.5 to about 7 against each of *Staphylococcus aureus* and *Escherichia coli*, as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

10. The thermoplastic resin composition according to claim 1, wherein the thermoplastic resin composition has a color difference (ΔE) of about 1 or less, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after exposure to Xenon-Arc light for 300 hours in accordance with ASTM D4459:

$$\text{Color difference}(\Delta E) = \sqrt{(\Delta L^*)^2 + (\Delta a^*)^2 + (\Delta b^*)^2} \qquad \text{[Equation 2]}$$

where ΔL* is a difference ($L_1^* - L_0^*$) between L* values before/after exposure; Δa* is a difference ($a_1^* - a_0^*$) between a* values before/after exposure; and Δb* is a difference ($b_1^* - b_0^*$) between b* values before/after exposure.

11. The thermoplastic resin composition according to claim 1, wherein the thermoplastic resin composition has a yellow index difference (ΔYI) of about 2.2 or less, as calculated according to Equation 3:

$$\Delta YI = YI_1 - YI_0 \qquad \text{[Equation 3]}$$

wherein $YI_0$ is an initial yellow index (YI) of a specimen, as measured in accordance with ASTM D1925, and $YI_1$ is a yellow index (YI) of the specimen, as measured in accordance with ASTM D1925 after the specimen is kept at 330° C. for 5 minutes.

12. The thermoplastic resin composition according to claim 1, wherein the thermoplastic resin composition has a Notched Izod impact strength of about 50 kgf·cm/cm to about 100 kgf·cm/cm, as measured on a ⅛" thick specimen in accordance with ASTM D256.

13. The thermoplastic resin composition according to claim 1, wherein the thermoplastic resin composition has a vicat softening temperature of about 135° C. to about 150° C., as measured at a heating rate of 120° C./hr under a load of 50 N in accordance with ISO 306/B50.

14. A molded article formed of the thermoplastic resin composition according to claim 1.

* * * * *